Nov. 1, 1932.  B. R. BENJAMIN  1,886,151
COTTON STRIPPER
Filed July 27, 1928   2 Sheets-Sheet 1
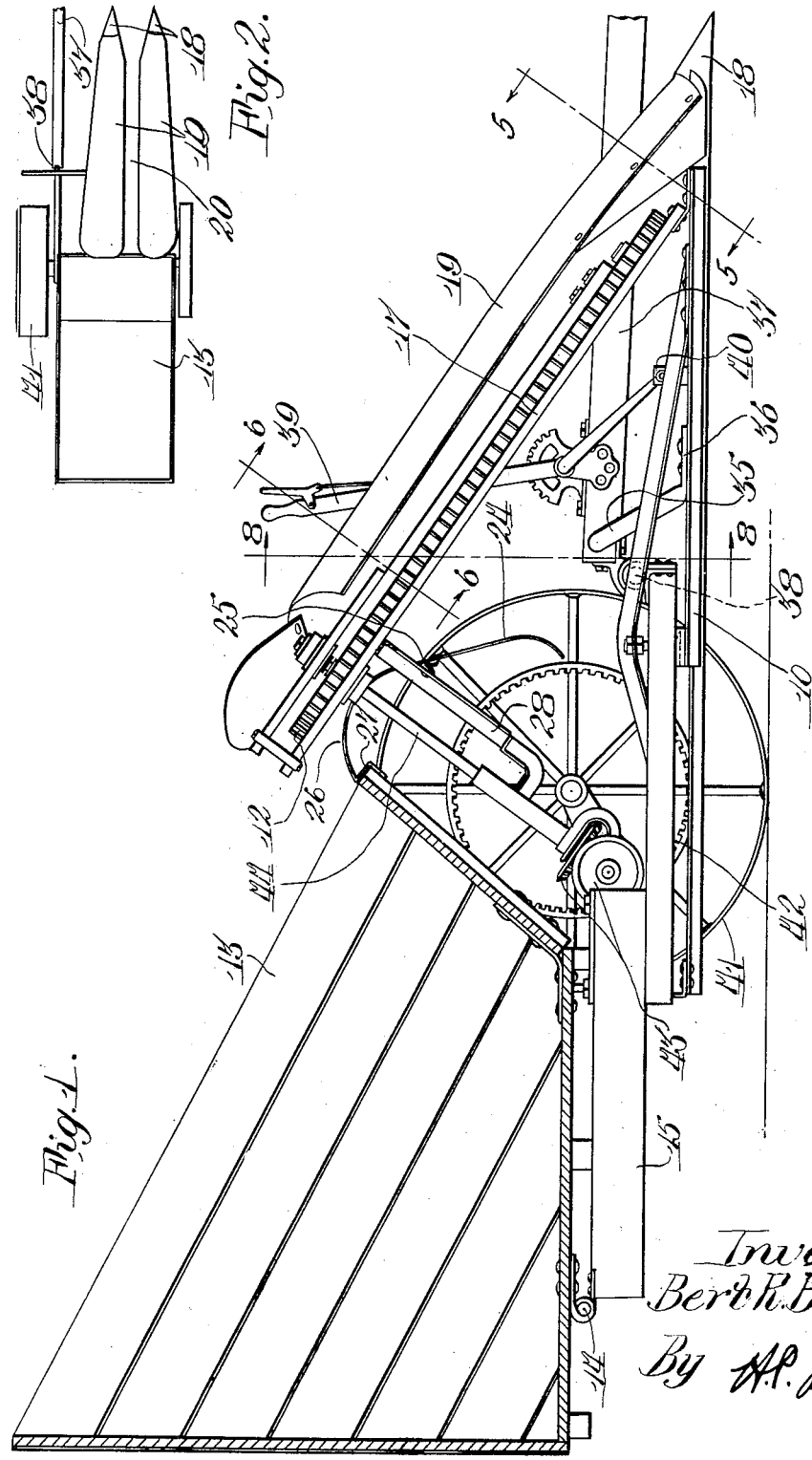
Inventor
Bert R. Benjamin
By H. P. Dodge
Atty.

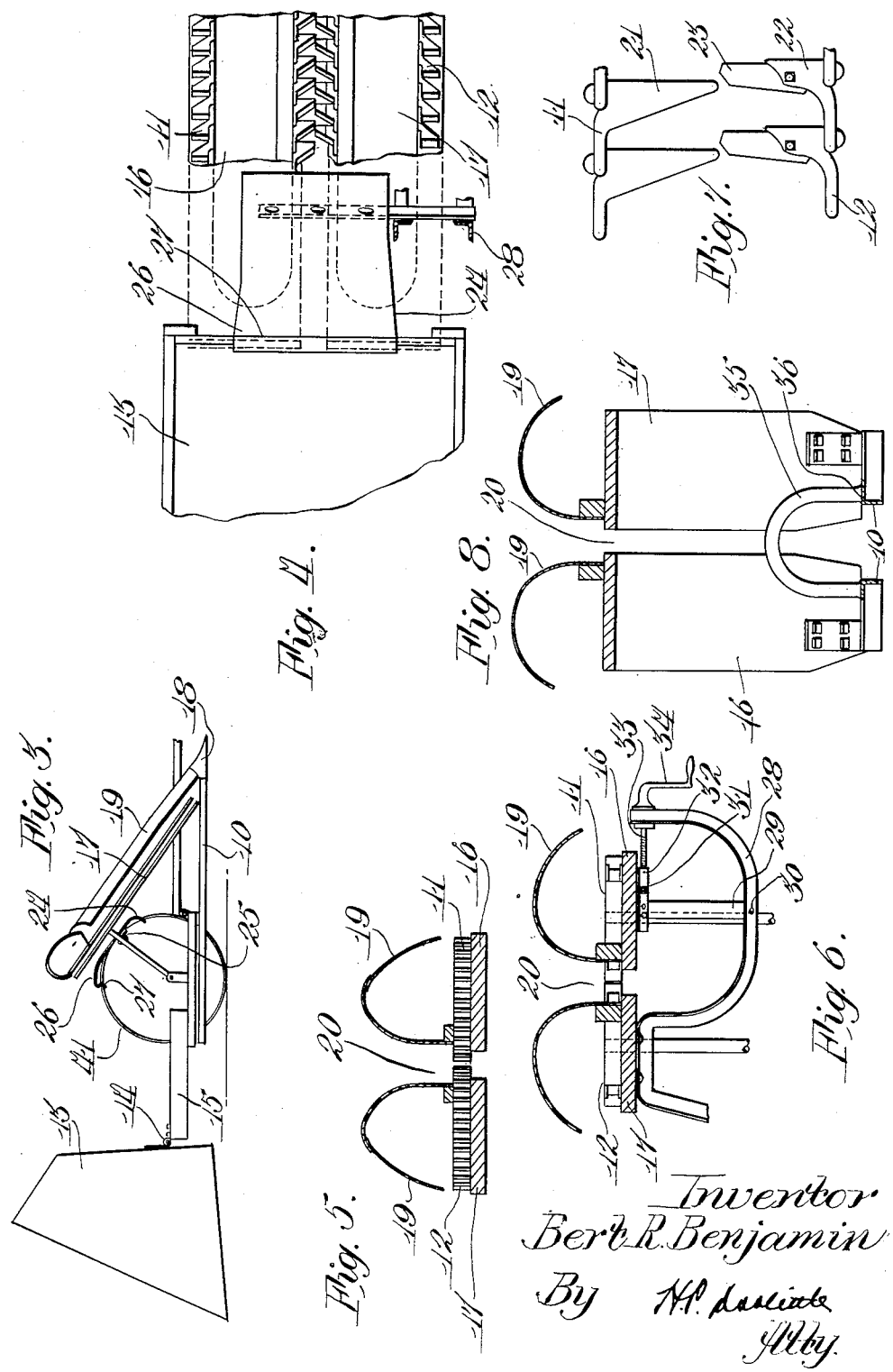

Patented Nov. 1, 1932

1,886,151

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

COTTON STRIPPER

Application filed July 27, 1928. Serial No. 295,642.

This invention relates to cotton harvesters, and more particularly to a field machine which strips cotton bolls from standing plants.

An object of the invention is to provide a cotton stripper having inclined endless belts or chains, equipped with cooperating projections, straddling cotton plants and stripping the bolls from the plants.

A further object of the invention is to provide a cotton stripper as a field machine, which can be advantageously operated to collect quantities of stripped bolls and can be quickly unloaded, so as to promote speedy harvesting of the crop.

Still another object is to improve the structure and increase the efficiency of the stripping elements.

Other objects of the invention will appear in the following description.

An illustrative embodiment of the machine is shown in the accompanying drawings, in which:

Figure 1 is a view partially in vertical, longitudinal section and partially in elevation;

Figure 2 is a diagrammatic plan of the complete machine;

Figure 3 is a diagrammatic elevation of the complete machine showing the hopper in dumping position;

Figure 4 is a detail, diagrammatic view, showing the arrangement of the hopper, the endless boll stripping chains, and the guide beneath the chains for insuring the movement of the stripped bolls to the hopper;

Figure 5 is an inclined, sectional view substantially on the line 5—5 of Figure 1;

Figure 6 is an inclined, sectional view taken substantially on the line 6—6 of Figure 1 and looking in the direction of the arrows;

Figure 7 is an enlarged detail view of the boll stripping chains showing the lugs of one chain equipped with resilient extensions; and Figure 8 is substantially a vertical sectional view taken substantially on the line 8—8 of Figure 1 and illustrating the relation of the supports for the stripping chains to the means which pulls the plants through the passage between the chains in a downward direction.

The illustrative cotton harvester comprises a wheel supported frame 10 carrying inclined boll stripping chains 11 and 12 which separate the bolls from the plants and deliver them to a collection hopper 13 preferably pivotally supported at 14 on an extension 15 of the frame 10, so that it may be tipped backwardly for unloading, as indicated in Figure 3 of the drawings.

The boll stripping chains are parts of stalk gathering apparatus including the inclined gathering boards 16 and 17 which are mounted on the frame. Other parts of this apparatus include the points 18 and the shields 19. The points act to guide plant stalks and branches into the plant passage 20 between the opposite sets of gathering devices and between the boll stripping chains 11 and 12.

Each stripping chain carries lugs which project into the plant passage 20, the lugs on the respective chains being in staggered or offset relation, as shown. Figure 7 of the drawings shows the chain 11 to be comprised of links having integral projections 21. The opposite chain 12 is shown provided with links having shorter extensions formed as sockets 22 for resilient extensions 23. These extensions 23 are preferably made of rubber or of some material having the characteristics of rubber, for promoting more effective boll stripping while lessening the breakage and collection of branches and twigs.

Beneath the gathering devices and located near their rearward ends is a guide, or shield 24. This guide is rigidly secured to the frame at 25 and is preferably fashioned as indicated in Figure 1 of the drawings. The lower part of this guide acts to keep plants from becoming entangled in the machine and to guide them so that they may be pulled downwardly between the stripping chains as the harvesting progresses. The rearward part 26 of the guide directs the stripped bolls to the collection hopper 13. This portion lies close to the gathering boards 16 and 17 at a position from which the inner runs of the stripping chains begin to diverge rearwardly and outwardly so as to throw the stripped bolls into the collection hopper 13. A shoulder 27 is provided on the guide 24 for receiving the forward edge of the hopper.

In order that the operation of the gathering devices and the stripping chains may be adequately adapted to meet various plant and field conditions, one set of the devices is provided with means whereby it may be moved toward or from the other to increase or decrease the plant passage 20. This means, as illustrated in Figure 6 of the drawings, comprises a support 28 rigidly secured to the gathering board 17 and extending as an upwardly opening arch past the position below the gathering board 16. A strut or upright 29 is pivoted at 30 on the support 28. This upright acts as a direct support for the gathering board 16, the stripping chain 11, and the associated shield 19. The strut carries a member 31 which supports a screw threaded part 32, operably receiving a screw threaded shaft 33 journaled in the support 28 as shown and provided with a handle 34, which may be turned to increase or decrease the size of the plant passage 20, as will be readily understood.

Beneath the gathering devices and positioned forwardly of the guide 24 is an arch 35, the upper portion of which contacts with the plants as the machine is drawn forward and pulls the plants downwardly between the extensions of the gathering chains and between the gathering devices. This arch is illustrated as rigidly secured at its lower ends 36 to the frame 10.

As illustrated in the drawings, the frame includes a draft member 37 preferably pivoted to the frame 10 at 38 and carrying adjusting mechanism 39 pivotally connected to the frame 10 at 40. This mechanism enables the points 18 to be set at different elevations relative to the ground level.

The machine illustrated includes means operable from ground wheels 41 for driving the boll stripping chains. This means includes a ring gear 42 carried by the supporting wheel, bevel gearing 43 driven by a suitable spur pinion (not shown) operatively engaging the ring gear 42. The upright shaft 44 extends through a gathering board and has fixed thereon a sprocket wheel about which one of the stripping chains runs. Another upright shaft similar to the shaft 44 is suitably driven and supported so as to drive the other boll stripping chain.

While the invention has been described with reference to one particular machine, it is to be appreciated that it is not necessarily limited to the details thereof, but that it is of a scope commensurate with the scope of the subjoined claims.

What is claimed as new is:

1. A cotton harvester comprising, in combination, a wheel supported frame, inclined gathering boards secured to the frame in laterally spaced relation to provide a plant passage therebetween, combined stalk receiving and boll stripping chains on said boards having their inner runs movable upwardly along the sides of the passage, inwardly projecting lugs carried by the chains and extending into the passage-way, means underneath the chains for engaging plant stalks to pull them through the passage between the chains, and means carried by the frame for operating the chains.

2. A cotton harvester comprising, in combination, a wheel supported frame, inclined gathering boards carried by the frame, an endless boll stripper chain operable above each board, plant engaging lugs on each chain projecting into a passage between the boards, means for moving the chains in an endless course, means for mounting one chain and one board so that they are movable as a unit toward or from the other board, and means for moving one board and chain toward or from the other board.

3. A cotton boll harvester comprising, in combination, a wheel supported frame, endless plant receiving and boll stripping chains carried by the frame, inclined gathering boards carried by the frame and supporting the chains, sprocket wheels carried by the boards for guiding and driving the chains, lugs carried by each chain so as to project into the plant passage between the boards, a shield above each board and chain, means below the gathering boards and forward of their rearward ends for deflecting plants bodily through the passage between the boards, means for driving the endless chains, and means rearwardly of the chains for receiving cotton bolls stripped from the plants by the chains.

4. A cotton harvester comprising, in combination, a wheel supported frame, opposed boll stripping chains carried by the frame in inclined positions, metal lugs projecting from the chains into the plant passage therebetween, and flexible extensions carried by the lugs of one of the chains.

5. In a cotton harvester, in combination, a vehicle, parallel elongated supports on the vehicle spaced to form a plant receiving passage, an endless chain mounted on each support for movement therealong and provided with finger-like projections extending laterally into the passage-way, the projections on one of said chains having portions composed of yielding material, and means for moving said chains in unison.

6. A gathering chain for stripper harvesters having its links formed with laterally extending seats, and rubber stripping fingers secured in and projecting from said seats.

In testimony whereof I affix my signature.

BERT R. BENJAMIN.